Inventors
HENRY F. HERBIG
EDWARD R. SCHMIDT
By Charles Baraff
Agent

Fig. 3 Fig. 4
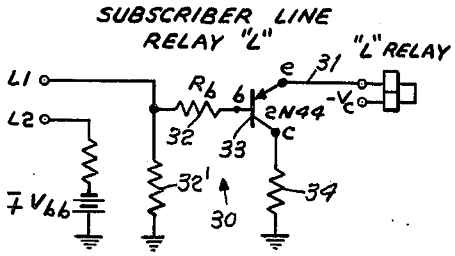
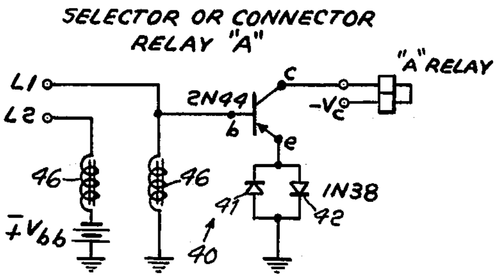
Fig. 5
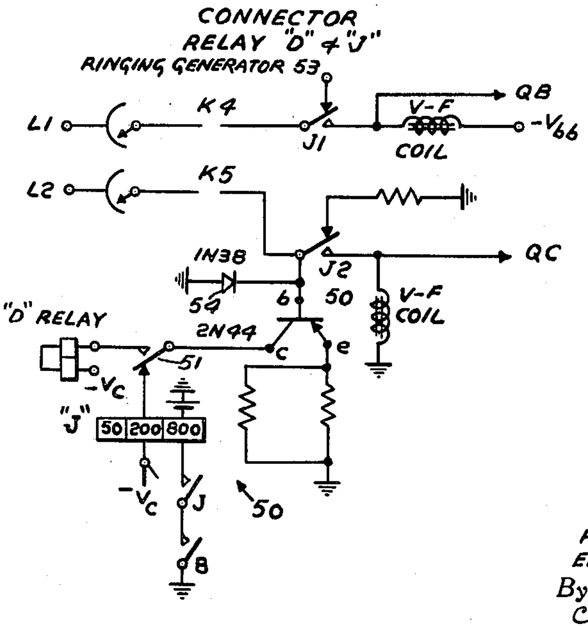
Inventors
HENRY F. HERBIG
EDWARD R. SCHMIDT
By Charles Baraff
Agent 2,993,092

TRANSISTOR AMPLIFIERS FOR RELAYS TO EXTEND TELEPHONE EXCHANGE SIGNALLING LIMITS

Henry F. Herbig, Smoke Rise, N.J., and Edward R. Schmidt, Rochester, N.Y., assignors to International Telephone and Telegraph Corporation, Nutley, N.J., a corporation of Maryland Filed Dec. 16, 1958, Ser. No. 780,810
9 Claims. (Cl. 179—18)

This invention relates to telephone dialing and transmission systems, and more particularly to step-by-step telephone systems wherein the range of telephone line transmission is extended.

In the telephone field, the problem of extending the range for telephone signalling and the voice intelligence has been a difficult and challenging problem. Ever since the advent of automatic telephone switching, the art has been developed to a high proficiency and has attained the present limits possible with existing electro-mechanical elements.

Prior to the advent of the 500–K type telephone subset, the ability to transmit voice intelligence over long distances was a limiting factor to the maximum range of a telephone line. With the improvements brought about by the 500–K telephone set with respect to the telephone transmitter, receiver and associated circuits, the range for transmission and reception of voice intelligence was thereby extended to such an extent that signalling limits (dialing, supervisory control, etc.) then arose as a prime limiting factor due to the impaired responsiveness of the signalling relays over the extended range of the line.

Accordingly, an object of the invention is to extend the signalling limits of a step-by-step telephone system and make it possible to provide longer local telephone circuits for the telephone exchanges.

Another object of the invention is to render smaller gauge cable conductors for a given distance practical for telephone signalling.

Another object of the invention is to provide transistor amplification and control of telephone line circuits, and of the various supervisory relay circuits.

A feature of the invention is a transistor amplifier connected in a telephone line relay circuit.

Another feature of the invention is a transistor amplifier connected in a telephone line, pulsing relay circuit wherein diodes associated with the transistor amplifier provide a control resistance variable in accordance with the range of telephone line operation.

Another feature of the invention is a telephone line with a transistor amplifier, which can be switched between various supervisory relays.

Another feature of the invention is a direct current transistor amplifier for activating a supervisory relay at constant current operation by isolating the relay from a loop telephone line with variable characteristics including extended range.

Referring to the figures of the drawing:

FIG. 3 is a transistor amplifier for activating a subscriber line relay (L) in the telephone circuit of FIG. 2;

FIG. 4 is a transistor amplifier for activating a selector or connector pulsing relay (A) in the circuit of FIG. 2;

FIG. 5 is a transistor amplifier which is switched between two supervisory (J and D) relays in a telephone circuit of FIG. 2.

Figure 1:
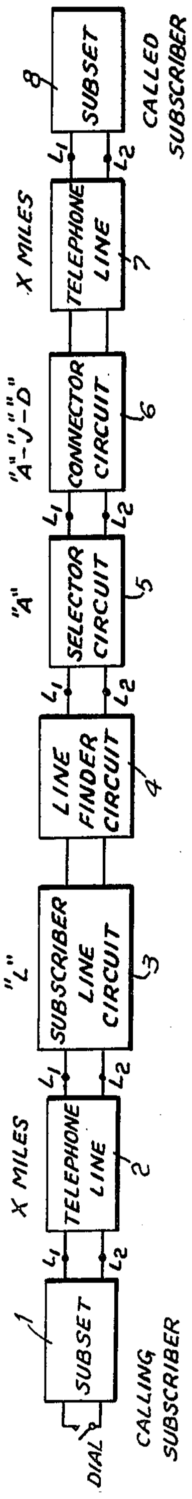
FIG. 1 is a block schematic of a step-by-step telephone circuit connecting two subscribers.
Figure 2:
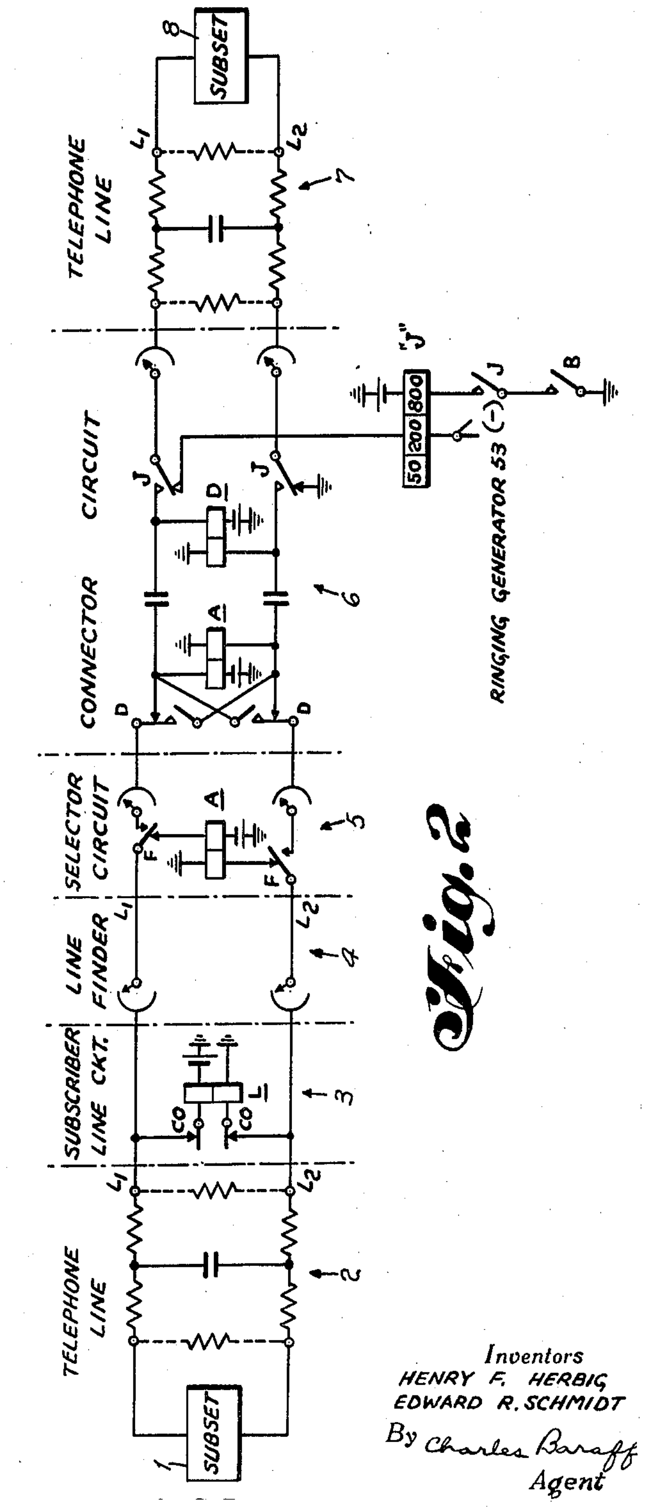
FIG. 2 is a circuit schematic of a telephone circuit as in FIG. 1, but illustrating more particularly the location of various key supervisory relays.

The subscriber's line circuit shown in FIGS. 1 and 2 is a well-known circuit arrangement for connecting a calling and called subscriber. A calling subscriber dial subset 1, preferably K–500 type, connects to a telephone line 2 representing a line distance of X miles, thence to a subscriber line circuit 3, a line finder 4, selector 5, connector circuit 6, and a called subscriber's subset 8 associated with a telephone line 7, representing X miles.

In establishing a telephone call between two subscribers, certain key relays are activated for making conventional connections for registering dialing pulses and for signalling supervision. As illustrated in FIG. 2, these relays are designated by the letters L, A, J and D, to wit: line relay L, dial pulsing relay A, ringing trip relay J and the called line answering supervisory relay D. In accordance with the invention, each of these relays is associated with a transistor amplifier whose principal function is to amplify the supervisory currents and thereby to enable the relays to operate to extend the distance or range of operation for local telephone circuits with impedances in excess of their normal limits. The transistor amplifiers enhance the sensitivity of the circuits of the associated relays, and in some instances, provide variable, controlling resistors in the form of diodes, to provide constant current for relay operation under variable range conditions of the extended telephone line.

Referring to FIG. 2, the first circuit concerned in the operation and completion of a telephone call is the "L" relay of the subscriber line circuit 3. Its transistor amplifier 30 (FIG. 3) operates when the calling subscriber lifts the handset and closes the telephone loop. In a sense, the transistor acts as a valve to feed a substantially constant current to its load, i.e., relay L. The relay L operates and the line finder 4 starts searching for the calling line. When the line finder 4 reaches the calling line, the circuit is completed to the selector circuit relay "A." Its transistor amplifier 40 (FIG. 4) operates the "A" relay. The first digit dialed is received by the transistor which reproduces these pulses and causes the relay "A" to pulse normally. After the first digit, the selector bank selects a connector 6. The "A" relay of the connector 6 is operated by another transistor amplifier, similar to the amplifier 40 (FIG. 4). The second digit dialed by the calling subscriber is reproduced by this transistor and its "A" relay to step the connector to the proper level. The next digit steps the connector arm around to the desired line.

The ringing through a ringing trip relay "J" and the answering supervisory relay "D" are activated by a transistor amplifier 50 (FIG. 5). The control feature of its transistor amplifier prevents the "J" relay from operating during ringing but when the D.C. path is closed at the called party telephone set, the "J" relay operates because the base of the transistor is driven more negative causing a large increase in the collector current which operates the "J" relay. The operation of the "J" relay disconnects the "J" relay operating winding from the collector circuit of the transistor and connects the windings of the "D" relay in the collector circuit in place of the "J" operating relay winding. The "J" relay remains operated thru one of its locking contacts. The operation of the "D" relay gives the reverse battery signal indicating that the call has been answered. It also provides switch hook supervision for the called party. The details of the circuit connections and operation of the transistor amplifiers 30, 40, 50 and their associated relays are set forth more fully in FIGS. 3, 4 and 5.

FIG. 3 shows a transistor amplifier circuit 30 connected between the line relay L and the telephone line terminals $L_1L_2$. A common collector configuration for the transistor was found to be most effective for operation over the maximum and zero line loop impedance with a minimum leak resistance of 15,000 ohms. With the amplification provided by the transistor amplifier 30, it became possible to operate relay "L" under the worst circuit conditions and over twice the normal limit for the subscriber's line loop.

As shown in FIG. 3, the line relay L is connected in the emitter circuit 31 of the transistor amplifier 30, while resistors 32, 32' are connected to the transistor base to provide reliability and proper functioning over the extended loop ranges by effectively controlling the input impedance of the transistor base circuit 33 and the load current of the collector. The grounded resistor 34 approximately 10 ohms in the collector circuit of the transistor amplifier 30 provides stability of operation under the worst conditions of the telephone circuit.

FIG. 4 shows a transistor amplifier 40 connected between the pulsing A relay of a selector or connector and the line terminals $L_1L_2$. The transistor amplifier 40 is arranged in a common emitter configuration with the A relay in the collector circuit and two (1N38) semi-conductor diodes 41, 42 arranged in parallel, one in a forward sense and the other in a reverse sense, as shown, to provide a variable controlling resistor in the emitter lead to ground. The A relay in the collector circuit acts as a substantially constant load with the current thru the 200 ohm choke coils 46 from 25 milliamperes on the maximum line resistance loop to 70 milliamperes on zero ohm line loop where the 500 type telephone set is used. The diodes 41 and 42 control the current thru the "A" relay so that it pulses satisfactorily over maximum and minimum line loop resistances and also for maximum and minimum line leak conditions. The battery feed to the subscriber's line circuit $L_1L_2$ is through inductive coils 46 having an inductance of approximately 0.7 henry which are required to minimize transmission losses.

FIG. 5 shows a transistor amplifier 50 connected to the J and D relays of the connector. A single transistor amplifier 50 serves for both the ringing trip and answering supervisory relays J and D with transfer contact 51 on relay J switching the output of the transistor amplifier 50 from the J relay to the D relay when the called party answers. The ringing generator 53 provides a high voltage and in order to protect the transistor from being burned out, a protection diode 54 is connected to ground at the base lead of the transistor.

When the ringing current is applied to the called party's telephone line, the high impedance of the ringer coil at the called subscriber's set 8 prevents the operation of the "J" relay. However, when the call is answered, the line loop is shunted by the subset talking circuit greatly reducing the impedance of the line and causing the transistor to detect this change of the line and thence operate the J relay which locks thru its locking contact in the well-known manner. The operation of the J relay transfers the collector circuit of amplifier 50 to the winding of the D relay which operates reversing the polarity of the battery feed signalling that the call has been answered.

With the transistor amplifiers 30, 40, 50 connected as hereinbefore described, the dialing and signalling limits of a step-by-step telephone line are extended considerably beyond the normal talking range of the 500–K telephone subset. With even longer line loops it may be desirable to insert negative impedance repeaters for the purpose of increasing the voice intelligence levels as desired.

While we have described above the principles of our invention in connection with specific apparatus, it is to be clearly understood that this description is made only by way of example and not as a limitation to the scope of our invention as set forth in the objects thereof and in the accompanying claims.

We claim:

1. A telephone signalling circuit comprising a calling subscriber subset, a line loop circuit, called subscriber subset, relays for controlling the telephone signalling and means for enhacing the sensitivity of the circuits of said relays and extending the range of said line loop comprising a transistor amplifier connected to each relay, one of said transistor amplifiers having shunt diodes connected thereto to provide an automatically variable resistance, varying in accordance with the range of the line loop circuit.

2. The signalling circuit of claim 1, wherein said relays are a line relay, a ringing trip relay, an answering supervisory relay, and a pulsing relay and an inductive coil connected to the pulsing relay amplifier.

3. The signalling circuit of claim 1, wherein one transistor amplifier is connected to a line relay, said amplifier having a base electrode coupled to the line loop and providing a common collector configuration, and a stabilizing resistor connected in its collector circuit.

4. The signalling circuit of claim 2, wherein a transistor amplifier is connected to the pulsing relay and said diodes are connected in parallel to the emitter electrode thereof to provide a variable control resistance whereby the pulsing relay will pulse over maximum and minimum line loop ranges.

5. The signalling circuit of claim 2, and two connector relays, a ringing generator, and a single transistor amplifier common to said connector relays, said amplifier having a protective diode connected thereto.

6. The signalling circuit of claim 1, wherein one transistor amplifier is common to two of said relays comprising the ringing trip relay and the answering supervisory relay and means including a transfer contact on one of said relays for transferring the output of the transistor amplifier to the other relay.

7. The signalling circuit of claim 2, wherein said transistor amplifiers activate said relays to complete a dial call from one subscriber's set to the other whereby a doubling of the range of the line loop connection is provided.

8. The signalling circuit of claim 5, and means connected to one relay for switching the transistor amplifier to the other relay when the called subscriber subset answers.

9. The signalling circuit of claim 1, wherein one of said relays operates under approximately constant current conditions, said transistor amplifier serving to isolate the relay from the line loop, said loop having variable characteristics.

References Cited in the file of this patent

UNITED STATES PATENTS 2,831,064 Faulkner ---------------- Apr. 15, 1958